$p = \sin^2 kv$

United States Patent Office 3,713,032
Patented Jan. 23, 1973

3,713,032
Q-SWITCHING LASER SYSTEM HAVING ELECTRONICALLY CONTROLLED OUTPUT COUPLING
John L. Wentz, Ellicott City, Md., assignor to Westinghouse Electric Corporation, Pittsburgh, Pa.
Filed Oct. 1, 1970, Ser. No. 77,093
Int. Cl. H01s 3/11
U.S. Cl. 331—94.5  7 Claims

ABSTRACT OF THE DISCLOSURE

A laser rod is optically aligned with a pair of totally reflecting mirrors forming an optical resonant cavity. A beam splitting polarizer and an electro-optical Q-switching cell are disposed along the optical axis of the cavity between the rod and one mirror. The beam splitting polarizer directs a portion of the energy in the laser resonator out of the cavity. The portion of the energy which is extracted is dependent upon the induced birefringence of the electro-optical Q-switching cell, the latter being selectively controlled in accordance with a voltage applied to the cell. The cell functions to alter the linearly polarized light beam emitted by the laser to an elliptically polarized beam, the orthogonal component of which is coupled from the resonator by the polarizer. In a hold-off mode, the laser rod is pumped but the Q-switching cell is activated to cause the polarizer to couple spontaneously emitted radiation from the cavity, preventing oscillation. In the pulse mode, the Q-switching cell is activated to effect feedback by the polarizer of sufficient energy to the laser rod to cause oscillations with a portion of the oscillating energy coupled out of the cavity by the polarizer. By electronic tuning of the Q-swtiching cell, optimum output coupling conditions are obtained.

BACKGROUND OF THE INVENTION

Field of the invention

The invention relates to oscillators of the optical resonant type and, more particularly, to Q-switched lasers having means for electronically varying the output coupling from the laser.

DESCRIPTION OF THE PRIOR ART

Prior art Q-switched lasers afford only a fixed value of output coupling by virtue of their resonator configuration. In these configurations, an output mirror having predetermined, fixed reflective/transmissive characteristics is placed at one end of the optical resonant cavity. During the hold-off period energy is built up in the laser by additional apparatus which prevents feedback of spontaneously emitted radiation to the laser rod. During the pulse period the resonant cavity is allowed to oscillate and the partially reflecting mirror returns emitted radiation to the laser rod and transmits a portion of emitted radiation as an output beam.

In order to vary the output coupling, it is necessary to replace the partially reflecting mirror with another mirror having different reflective and/or transmissive characteristics. Adjustment of the output coupling by this technique is not always practical. The output coupling factor for maximum output energy at a given input pump energy is dependent upon the internal losses of the resonator and, more importantly, the internal losses of the laser rod. These internal losses can only be determined by experimental measurement and are known to vary from one laser rod to the next. Thus, a wide assortment of output mirrors with various reflectivity/transmissive characteristics is required, the mirrors being interchanged to select the one providing the maximum output energy.

Further, after each mirror change, the resonator must be realigned to assure that the new mirror is precisely perpendicular to the optical axis. Since it is virtually impossible to produce the same alignment for each successive trial, there exists an uncertainty whether or not the laser is operating at optimum coupling.

The prior art technique for achieving the optimum output coupling for a given laser is therefore undesirable in that it is a time-consuming process, requiring a large supply of the partially reflecting mirrors, and affords uncertain results. The invention overcomes these and other problems of the prior art systems.

SUMMARY OF THE INVENTION

In accordance with the present invention, a Q-switched laser system is electronically tuned for varying the output coupling, assuring precise selection of the optimum output coupling coefficient for a given laser system; further, the invention eliminates the prior art requirement of employing a succession of mirrors of various different reflective/transmissive characteristics, and the resultant realignment thereby necessitated for each interchange of mirrors, for optimizing the operating conditions of the laser.

In the present invention, a Q-switched laser system includes a laser rod optically aligned with a pair of totally reflecting mirrors forming an optical resonant cavity. A beam splitting polarizer and an electro-optical Q-switching cell are positioned in the optical path between the rod and one mirror. The beam emitted by the laser rod passes through the beam splitting polarizer and the Q-switching cell to be reflected in the reverse direction by the adjacent one of the totally reflecting mirrors and again to pass through the Q-switching cell and the polarizer in the direction of the laser rod.

The electro-optical Q-switching cell has selectively variable birefringent characteristics, as induced in accordance with the magnitude of a voltage applied to the cell. The linearly polarized laser beam generated by the laser rod polarizer combination thus passes through the Q-switching cell twice, and is altered in its polarization to some degree of elliptical polarization in accordance with the induced birefringence of the cell. The elliptically polarized beam includes a component orthogonal to, and a component aligned with the linearly polarized beam incident on the cell, the relative magnitudes of those components varying in accordance with the induced birefringence of the cell. The beam splitting polarizer transmits, and thus returns, the beam component of the original linear polarization to the laser rod, and reflects, and thus couples to the output, the orthogonal component.

In operation, the laser is cycled through two modes. In the hold-off mode, the laser is pumped with a source of energy, resulting in the spontaneous emission of photons. The Q-switching cell is activated to alter the polarization of the incident beam in its entirety to the orthogonal polarization. The beam splitting polarizer therefore couples all spontaneously emitted radiation out of the laser. Thus, no feedback to the laser rod occurs to support oscillation. The hold-off mode preferably continues until the laser rod has absorbed the maximum amount of energy.

The laser system is then operated in the pulse mode in which a portion of the spontaneously emitted radiation is fed back to the laser and another portion is coupled out of the optical path to provide the output laser beam. The voltage applied to the Q-switching cell in the pulse mode is selectively varied in magnitude to vary the induced birefringence of the Q-switching cell and correspondingly vary the degree of elliptical polarization of the incident linearly polarized beam produced by the cell. As previously noted, the laser beam component of the original polarization is fed back to the laser rod to initiate and sustain oscillations, and the orthogonal component of the beam is coupled out of the laser system by the beam splitting polarizer.

The magnitude of the voltage applied to the Q-switching cell thus is varied to achieve the optimum output coupling conditions for the laser. The electronic tuning of the output coupling provided by the system of the invention thus affords precise tuning for optimizing the laser operating conditions in a simple and efficient manner. Further, a sensing and servo system is provided which senses the energy level of the oscillating laser beam within the resonant cavity during the pulse mode for automatically varying the voltage supplied to the Q-switching cell to maintain the optimum operating conditions.

DETAILED DESCRIPTION OF THE INVENTION

The fundamental nature of the operation of a laser in accordance with the quantized energy states of matter and the generation of stimulated emission is well known. The present invention is directed to optimizing the output energy coupling coefficient of a laser and more particularly to varying the output coupling coefficient in an automatic manner by electronic tuning of a Q-switching cell contained within the optical resonant cavity.

Figure 1:
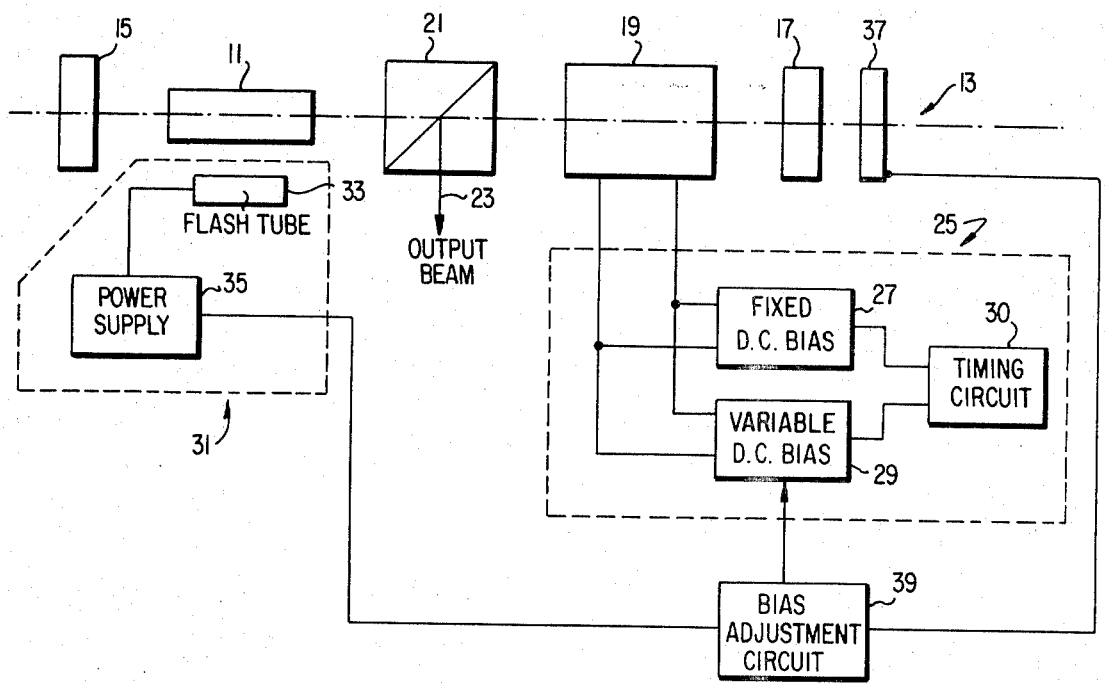
FIG. 1 is a schematic diagram of a Q-switched laser system having electronically controlled output coupling.

FIG. 1 is a schematic, block diagram of a Q-switched laser system in accordance with the invention, having electronically controlled output coupling. A laser rod 11 formed of a material capable of Q-switched operation, such as ruby, is aligned with an optical axis 13. A pair of totally reflecting mirrors 15 and 17 are positioned at opposite ends of the laser and aligned orthogonally to the optical axis 13. An electro-optical Q-switching cell 19 is positioned adjacent to and intermediate a beam splitting polarizer 21 and the totally reflecting mirror 17, in alignment with the optical axis 13.

The laser rod 11 comprises the source of coherent optical energy of the laser system of the invention, the optical energy produced by rod 11 being linearly polarized in a vertical direction by the nature of the beam splitting polarizer. The laser rod, or crystal, in combination with the polarizer amplifies and oscillates for only a particular plane of polarization. As explained hereafter in more detail, the polarizer 21 and Q-switching cell 19 cooperate to selectively control both the regenerative feedback of energy to the laser rod 11 and the output coupling coefficient of the system to afford optimum operating conditions of the laser with maximum energy in the output laser beam.

The electro-optical Q-switching cell 19 serves to alter a linearly polarized beam passing through the cell to some degree of elliptical polarization depending on the voltage applied to the cell. In particular, the electro-optical effect in crystals is the result of the induced birefringence which occurs when an electric field is applied to the crystal along a particular axis. Birefringence is a consequence of anisotropy in the crystal indices of refraction along the principal crystal axes. Plane polarized light incident upon a birefringent crystal experiences double refraction and phase retardation between the orthogonal components of the resonant light vibrating along the principal optical axes in the crystal. Thus, electro-optical crystals, which are normally uniaxial become biaxial when an electric field of an appropriate amplitude is applied to a given axis of the crystal. A suitable electro-optical Q-switching cell for use in the present invention is described in detail in U.S. Pat. No. 3,429,636 issued to John L. Wentz and assigned to the assignee of the present application.

With reference to FIG. 1 and as above noted, the beam generated by the laser rod 11 passes through the polarizer 21 and is incident on the Q-switching cell 19, after passage through which it is incident upon and is reflected by the mirror 17. After reflection, the beam again passes through the cell 19 to be incident on the beam splitting polarizer 21.

Thus, the light beam emitted by the laser rod 11 passes twice through the electro-optical Q-switching cell 19. That beam as originally emitted by rod 11 may be linearly polarized, or a linearaly polarized beam is produced by the combination of the rod 11 and the polarizer 21. Accordingly, the beam splitting polarizer 21 is oriented with regard to its polarization to effect transmission of a linearly polarized beam of a preselected direction of polarization, herein disclosed as vertical, to the cell 19.

As later described in detail, in accordance with a first voltage applied to the cell 19, a beam passing therethrough is altered from linear polarization to circular polarization. The circularly polarized beam, as reflected by mirror 17, then again passes through cell 19 and the polarization thereof is altered from circular again to linear. However, whereas the beam from the rod 11 was initially vertically polarized, the beam emerging from the cell 19 in the direction of the rod 11 is horizontally polarized. However, by applying a second, different voltage to the cell 19, a degree of elliptical polarization of the beam is produced by the cell 19 wherein the beam includes a component in the original direction of linear polarization and a component orthogonal thereto.

The relative amplitudes of the original and/or orthogonal components of the beam emerging from the cell 19 are a function of the voltage applied to the cell, as hereinafter explained in more detail. It is sufficient here to note, however, that by virtue of the double passage of the beam through the cell 19, a reduced operating voltage for the cell is employed. For example, to achieve alteration of polarization from vertical to horizontal in a single passage through such a cell, a so-called half wave voltage is required. In the system of the present invention, since the beam passes through the cell twice, only a quarter wave voltage is required to achieve complete change in polarization from, for example, vertical polarization as produced in the output beam of the rod 11 to horizontal polarization.

In response to an incident beam, the beam splitting polarizer transmits a beam component of the original vertical polarization along the axis 13 and diverts any orthogonally, i.e., horizontally, polarized component in the direction of the output beam 23. Although the output beam 23 is shown to be diverted at right angles to the optical axis 13, it may be at an angle less than 90°.

As hereinafter explained in detail, the voltage applied to the Q-switching cell 19 is switched between a fixed value wherein the cell 19 has essentially maximum effect (90° rotation) on the polarization on the beam passing therethrough in either or both directions and a preselected, variable value wherein the polarization of the incident beam is altered in the two successive passes of the beam through the cell to include a component aligned with the original vertical component and a component orthogonal thereto. The preselected variable bias voltage particularly is selected to achieve maximum output coupling of energy, i.e., a maximum output coupling coefficient, while affording a component of the original vertical polarization of sufficient magnitude for transmittal by beam splitting polarizer 21 as regenerative feedback to the rod 11 for sustaining oscillations within the cavity.

Considering the electrical control portions of the system of FIG. 1 in more detail, there is provided a control circuit 25 for applying voltages of selectively variable value across the Q-switching cell 19, including a source 27 of fixed DC bias and a source 29 of variable DC bias. Timing circuitry 31 serves to select the source 27 of fixed DC bias during a hold-off mode of operation, and the source 29 of variable DC bias during a pulse mode of operation, as hereinafter discussed. The operation of the control circuitry 25 is later detailed. A pumping source 31 is provided to supply energy to the laser rod 11. The pumping source 31 is known in the art and conveniently may include a flash tube 33 coupled to a power supply 35.

The intensity, I, of the orthogonal component, and thus of the output beam 23, varies according to the equation:

(1) $$I = I_0 \sin^2 KV$$

where $I_0$ = intensity of laser energy incident on the beam splitting polarizer
K = constant of electro-optical Q-switching cell
V = voltage applied to the cell Defining the output coupling coefficient, or coupling factor, $p$, as the ratio of $I/I_0$ there results the equation:

(2) $$p = I/I_0 = \sin^2 KV$$

Therefore, it is apparent that the coupling factor $p$ can be varied from zero to unity by varying the voltage V applied to the Q-switching cell 19. Thus, output coupling from the optical resonator can be electronically controlled by varying the voltage applied to the Q-switching cell 19.

Figure 2:
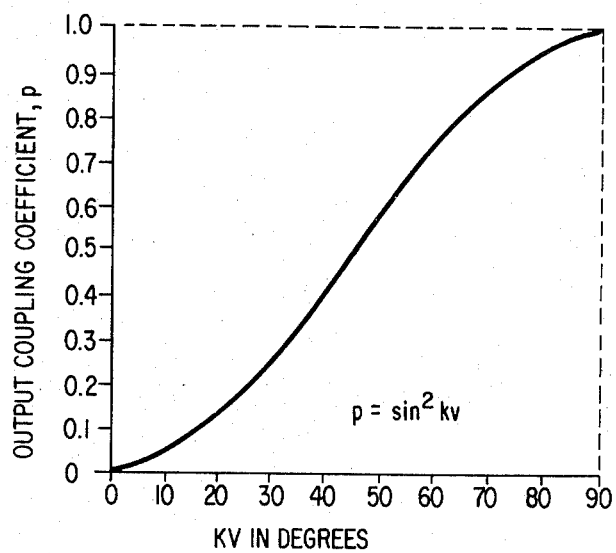
FIG. 2 is a graph illustrating the output coupling coefficient of the laser system as a function of the voltage applied to the Q-switching cell of the laser system.

FIG. 2 shows a graph illustrating the output coupling coefficient $p$ of the laser system as a function of the voltage applied to the Q-switching cell. In FIG. 2, the output coupling coefficient $p$ is shown along the vertical axis and the value KV in degrees is shown along the horizontal axis. The output coupling coefficient $p$ is a sinusoidal function varying from zero at 0° to 1.0 at 90°. Any intermediate value of output coupling coefficient $p$ may be obtained by appropriately selecting the value of the voltage V.

During the operation of the Q-switched laser system, two modes of operation are performed, the hold-off mode and the pulse mode. In the hold-off mode, the laser rod is pumped with energy and the spontaneous photons emitted by the rod are coupled out of the system to prevent feedback to the laser rod. As a result, no oscillation occurs in the optical resonator and energy is stored in the laser rod 11. The pumping of energy into the laser rod 11 continues for a period preferably not longer than the metastable life time of the active ions in the laser material. If longer, energy losses due to spontaneous emission from the laser material will offset stored energy gains. During pumping, to the extent that any spontaneous emission has occured, the system functions to couple that energy out of the resonant cavity to prevent oscillation. The laser rod thus is pumped preferably to obtain the maximum amount of stored energy in preparation for the pulsed emission mode.

In the pulse emission mode, the pumping of the laser rod is discontinued. A portion of the spontaneously emitted radiation is fed back to the laser rod 11 and a portion is coupled out of the optical resonator as a high energy output beam. The variable coupling is provided by the Q-switching cell 19 cooperating with the beam splitting polarizer 21. Typically, the period of the hold-off mode is in the range of tens to hundreds of microseconds, and the period of the pulse mode is in the nanosecond range. The pulsed emission mode may be initiated at a time other than when maximum energy has been stored in the laser rod 11. However, the optimum time for initiating the pulse mode to obtain the highest energy output is the time when maximum energy storage has occurred in the laser rod.

The operation of the Q-switching cell and the beam splitting polarizer during the hold-off and pulse modes will now be described in detail. Timing circuit 31 of control circuit 25 is set to alternately switch the outputs of the fixed DC bias source 27 and the variable DC bias source 29 to the cell 19 for the hold-off and pulse modes, respectively. In the hold-off mode, the pumping source 31 is supplying energy to the laser rod 11. As a result, spontaneous photons are emitted from the laser and are linearly polarized by the beam splitting polarizer 21. The emitted light from the laser rod passes twice through the optical cell 19 and impinges on the beam splitting polarizer 21. The bias voltage applied to the Q-switching cell 19 by source 27 is preselected to effect an induced birefringence of cell 19 such that substantially all of the beam emerging from the cell 19 and incident on the polarizer 21 is orthogonally polarized and thus horizontally polarized, with respect to the vertical polarization of the beam emitted by the rod 11 and polarizer 21 combination. Thus, substantially the entire beam is coupled out of the optical resonator by the polarizer 21. Feedback to the laser rod 11 thus is prevented and no oscillation occurs in the optical resonator. During this mode, energy is stored in the laser rod 11.

After sufficient energy is stored in the laser rod 11, and thus upon completion of the hold-off mode during which the pumping occurs, the pulsed emission mode of operation is performed. The pulsed emission mode is initiated preferably immediately upon completion of the pumping during the hold-off mode. The timing circuit 30 accordingly switches the variable DC bias source 29 to supply a voltage to the electro-optical cell 19. The magnitude of the voltage applied by the source 29 energizes cell 19 to elliptically polarize the incident beam. The beam emitted from the cell 19 and incident on the polarizer 21, therefore, includes an orthogonal component, comprising a substantial portion of the total beam energy produced by the rod 11, and a component of the original vertical polarization. The beam splitting polarizer 21 transmits the beam component of the original polarization along axis 13 to the laser rod 11 to provide energy feedback for sustaining oscillation, and deflects the orthogonal component of the beam to provide the output beam 23.

In order to optimize the performance of the laser rod 11, the portion of the beam generated within the resonator which is fed back to the laser rod 11 is adjusted by varying the voltage level of the bias source 29. Thus, the system of the invention provides for electronic tuning of the laser system, assuring the feedback necessary to maintain oscillation while maximizing the output energy coupled from the laser, in accordance with providing the optimum output coupling coefficient $p$.

Although the adjustment may be done manually, the system of the invention provides for automatic adjustment of the voltage level of bias source 29 to assure that the optimum condition is continuously maintained. For this purpose, a sensor 37 is positioned exteriorly of the mirror 17 and thus of the optical resonant cavity along the axis 13. Although mirror 17 is defined as a totally reflecting mirror, in a practical sense a very small percentage of the beam resonating within the cavity is transmitted through the mirror 17. It is this small percentage which is sensed by the sensor 37 and applied to a bias adjustment circuit 39. An output from power supply 35 is also supplied to the circuit 39. The circuit 39 thus receives a measure of the energy supplied to the system and of the energy level of the beam oscillating within the system and produces a control output which is applied to the variable DC bias source 29 to continuously provide for an optimum output coupling coefficient while maintaining the necessary regenerative feedback for maximum efficiency of the system and maximum energy of the output beam.

It is apparent that various modifications may be made in the laser system described herein without departure from the scope of the invention. Accordingly, the invention is not to be considered limited by the description but only by the scope of the appended claims.

I claim as my invention:

1. A laser system for selectively varying electronically the output coupling to achieve an optimum output coupling coefficient for a given laser oscillator comprising
  an elongated opticval resonant cavity including first and second reflective end members spaced apart along the optical axis of said cavity,
  an active laser material within said cavity responsive to input energy supplied thereto for generating a beam along said axis,
  pumping means for supplying pump energy to said laser material,
  a beam splitting polarizer within said cavity for transmitting along said axis an incident, axially directed beam component of a predetermined direction of polarization and for coupling out of said resonant cavity an incident, axially directed beam component of an orthogonal direction of polarization relative to said predetermined direction,
  an electro-optic cell intermediate said polarizer and one of said reflective end members and axially aligned in the reflective beam transmitting path therebetween, said electro-optic cell having an induced birefringence variable in amount in response to the voltage supplied thereto for selectively altering the polarization of a beam in the reflective beam transmitting path,
  means for supplying a first predetermined voltage to said cell alter the polarization of a beam transmitted to said polarizer by said cell to said orthogonal direction for coupling out of said cavity by said polarizer to prevent oscillation within said cavity and for supplying a second, selectively variable voltage to said cell to alter the polarization of a beam transmitted by said cell to said polarizer to include a selectively variable component in said predetermined direction of polarization for transmission by said polarizer to said laser rod for providing regenerative feedback to maintain oscillation in said cavity and a selectively variable component in said orthogonal direction for coupling out of said resonant cavity a selectively variable intensity output laser beam, and
  means for alternately connecting said first predetermined voltage and said second selectively variable voltage to said cell in accordance respectively with the hold-off time of said laser material for preventing oscillations within said cavity and with the pump pulse time of said laser material for maintaining oscillation within said cavity while coupling said selectively variable intensity orthogonal beam component out of said cavity to provide controlled output coupling from said resonant cavity.

2. A laser system as recited in claim 1 wherein each of said reflective end members each comprises a totally reflecting mirror.

3. A laser system as recited in claim 1 wherein there is further provided:
  means for sensing beam energy transmitted through said one reflective end member by virtue of imperfect total reflection thereat to provide a measure of energy level of the beam oscillation within said resonant cavity, and
  means responsive to said energy level sensing means and to the level of input energy supplied said laser material for beam generation, for adjusting the level of said second variable voltage to optimize the output coupling coefficient of the laser system.

4. In a laser system having an elongated resonant cavity defined by first and second totally reflecting end members spaced apart along the optical axis of said cavity and including in optical alignment within said cavity, an active laser material energizable for producing a beam along said axis, a beam splitting polarizer for transmitting along said axis an incident, axially directed beam component of a predetermined direction of polarization and for coupling out of said resonant cavity an incident, axially directed beam component of an orthogonal direction of polarization relative to said predetermined direction, and an electro-optical cell intermediate said polarizer and an adjacent end member, the method of operation comprising:
  pumping said laser material to store energy therein during a hold-off period,
  supplying a first predetermined voltage to said cell during the hold-off period to alter the polarization of a beam transmitted thereby to said polarizer to a direction orthogonal to said predetermined direction of linear polarization, said beam splitting polarizer coupling the beam of the orthogonal direction of polarization out of said cavity to prevent oscillation therewithin during the hold-off period, and
  supplying a second, selectively variable voltage to said cell during a pulsed emission period for altering the polarization of a beam transmitted by said cell to said polarizer to include a selectively variable component in said predetermined direction and a selectively variable component in said orthogonal direction of polarization, said polarizer transmitting said selectively variable beam component of said predetermined direction of polarization to said laser material to provide regenerative feedback for maintaining oscillation within said cavity while coupling said selectively variable orthogonal beam component out of said cavity to provide controlled output coupling from said resonant cavity.

5. A method of operation of a laser system as recited in claim 4 wherein pumping of said laser material is discontinued during said pulsed emission period.

6. A method of operation of a laser system as recited in claim 4 further comprising:
  sensing the energy level of oscillations within said cavity during a pulsed emission period, and
  selectively varying said second voltage in response to the energy level of oscillations thus sensed and to the pumping energy supplied said laser material for maximizing the coefficient of output coupling of the laser system.

7. A method of operation of a laser system as recited in claim 6 wherein the energy level of oscillations within said cavity is sensed by sensing the portion of an incident beam transmitted by one of said totally reflecting end members.

References Cited

UNITED STATES PATENTS

| | | | |
|---|---|---|---|
| 3,577,097 | 5/1971 | Hilberg | 331—94.5 |
| 3,521,188 | 7/1970 | Sooy | 331—94.5 |
| 3,497,828 | 2/1970 | Telk et al. | 331—94.5 |

OTHER REFERENCES

Hook et al.: Proc. IEEE, December 1966, pp. 1954–5.

RONALD L. WIBERT, Primary Examiner

R. J. WEBSTER, Assistant Examiner